US011501161B2

(12) United States Patent
Venkatraman et al.

(10) Patent No.: US 11,501,161 B2
(45) Date of Patent: Nov. 15, 2022

(54) METHOD TO EXPLAIN FACTORS INFLUENCING AI PREDICTIONS WITH DEEP NEURAL NETWORKS

(71) Applicant: ADOBE INC., San Jose, CA (US)

(72) Inventors: Vaidyanathan Venkatraman, Fremont, CA (US); Rajan Madhavan, Foster City, CA (US); Omar Rahman, San Jose, CA (US); Niranjan Shivanand Kumbi, Fremont, CA (US); Brajendra Kumar Bhujabal, San Ramon, CA (US); Ajay Awatramani, Fremont, CA (US)

(73) Assignee: ADOBE INC., San Jose, CA (US)

( * ) Notice: Subject to any disclaimer, the term of this patent is extended or adjusted under 35 U.S.C. 154(b) by 895 days.

(21) Appl. No.: 16/375,037

(22) Filed: Apr. 4, 2019

(65) Prior Publication Data

US 2020/0320381 A1 Oct. 8, 2020

(51) Int. Cl.
*G06K 9/62* (2022.01)
*G06N 3/04* (2006.01)
*G06N 3/08* (2006.01)
*G06Q 10/06* (2012.01)

(52) U.S. Cl.
CPC ............. *G06N 3/08* (2013.01); *G06K 9/6227* (2013.01); *G06N 3/0454* (2013.01); *G06Q 10/067* (2013.01)

(58) Field of Classification Search
CPC ...... G06N 3/08; G06N 3/0454; G06K 9/6227; G06Q 10/067
See application file for complete search history.

(56) References Cited

U.S. PATENT DOCUMENTS

2020/0219274 A1* 7/2020 Afridi ........................ G06T 7/45
2020/0285737 A1* 9/2020 Kraus .................... G06F 21/554

* cited by examiner

*Primary Examiner* — John J Lee
(74) *Attorney, Agent, or Firm* — Shook, Hardy & Bacon L.L.P.

(57) ABSTRACT

Embodiments of the present invention provide systems, methods, and computer storage media for providing factors that explain the generated results of a deep neural network (DNN). In embodiments, multiple machine learning models and a DNN are trained on a training dataset. A preliminary set of trained machine learning models with similar results to the trained DNN are selected for further evaluation. The preliminary set of machine learning models may be evaluated using a distribution analysis to select a reduced set of machine learning models. Results produced by the reduced set of machine learning models are compared, point-by-point, to the results produced by the DNN. The best performing machine learning model with generated results that performs closest to the DNN generated results may be selected. One or more factors used by the selected machine learning model are determined. Those one or more factors from the selected best performing machine learning model may be provided to explain the results of the DNN and increase confidence in the understanding and accuracy of the results generated by the DNN.

20 Claims, 11 Drawing Sheets

METHOD TO EXPLAIN FACTORS INFLUENCING AI PREDICTIONS WITH DEEP NEURAL NETWORKS

BACKGROUND

Marketers typically have access to limited information when determining which consumers to target for a product and/or service. Predicting a consumer's likelihood of performing a particular activity (e.g., open an email, attend an event, etc.) is crucial to effectively market products and/or services. With advancements in artificial intelligence (AI), marketers are now able to use many factors and multiple data sources to assist in identifying leads with potential interest in a product and/or service. When making predictions, the factors that influence the predictions are often critical to understanding the resulting outcome. For example, analyzing the features that produce an outcome may expose hidden factors that affect the outcomes. Interpreting these factors may provide marketers better insight into adjusting their marketing tactics to target leads with the greatest propensity to perform an activity (e.g., open an email, attend an event, etc.). Additionally, understanding the underlying factors can help establish trust with marketers or other users that the predictions are accurate.

Conventional methods for determining factors that influence predicted outcomes include using traditional machine learning models and algorithms. Typically, interpreting the results of some traditional machine learning models is straightforward by tracing the results step-by-step all the way back to the input. Other traditional machine learning models and algorithms typically require the extraction of input features before classifying an input data set. Because the input features are known, this allows for less complex data and makes patterns affecting the outcomes more visible. However, these traditional machine learning models may suffer from a loss in performance and/or accuracy compared to AI systems using a neural network. Generally, neural networks learn features from input data in an incremental manner and can handle large amounts of data compared to other machine learning models. Neural networks often use graphical processing units (GPUs) that assist in handling the massive amounts of data and provide more processing power.

Interpreting the results of neural network based AI models remains a difficult task. Common methods include analyzing the distribution of weights after training a neural network model to provide explanations about the outcome, but this method does not guarantee complete accuracy. Still other methods include altering input values of a neural network based AI model and determining the impact on the output. However, these common methods require an extensive amount of computational resources and do not properly scale as the number of input features considered by the neural network increases. Accordingly, there is a desirability for maintaining the accuracy, performance and stability of a neural network based AI model while also having capability to present or explain the underlying factors influencing the decisions of the neural network, similar to the manner in which machine learning models can provide such underlying factors and explanations.

SUMMARY

Embodiments of the present invention involve providing factors that explain the results generated by a deep neural network (DNN) with a given dataset to increase trust and confidence in the results generated by the DNN. At a high level, multiple machine learning models and a DNN are trained on the same training dataset and evaluated on the same testing dataset. The evaluated machine learning models and DNN each generate corresponding results that are based on one or more factors. The machine learning model with the closest performance evaluation relative to the DNN may be selected as the "best performing" machine learning model. The factors used by the best performing machine learning model to generate results may be determined and provided to explain the results generated by the DNN. More specifically, the performance of the trained machine learning models may initially be evaluated using standard accuracy metrics to narrow down the set of machine learning models used for comparison to the DNN. The narrowed set of machine learning models may further be evaluated using a distribution analysis test and comparing, point-by-point, the results (e.g. likelihood values) produced by the machine learning models and the DNN to select the best performing machine learning model, i.e., the machine learning model having the closest performance relative to the DNN. The factors used by the best performing machine learning model to generate results with the closest performance to the DNN may be provided with the corresponding results generated by the DNN. As such, providing those factors used by the best performing machine learning model to generate results for explaining the corresponding generated results of a DNN may increase confidence that the results generated by the DNN are understood and accurate.

Generally, the performance of the trained machine learning models may be evaluated to generate corresponding results based on a comparison of standard accuracy metrics and a distribution analysis to select a machine learning model that performs closest to the DNN. The distribution analysis may be performed on the preliminary set of machine learning models to further narrow the set down to a reduced set. The results (e.g., likelihood values) generated by the reduced set of machine learning models and the DNN may be compared, point-by-point, to determine which machine learning model in the reduced set least deviates from the DNN. Thus, the performance of multiple machine learning models may be evaluated to determine the factors used by the best performing machine learning model to explain the results generated by a DNN.

More particularly, the results (e.g., likelihood values) generated by each machine learning model that are within a predetermined threshold of the corresponding results (e.g., likelihood values) generated by the DNN are indicated as a positive outcome. In some embodiments, the machine learning model in the reduced set with the highest positive outcome rate may be selected as the best performing machine learning model. The factors used by the best performing machine learning model to generate corresponding results may be provided to explain the results generated by the DNN. The factors may be presented in various ways including by ranking the factors according to their corresponding feature weights in the best performing machine learning model.

As such, techniques described herein facilitate providing factors used by a best performing machine learning model to generate results that explain the corresponding results generated by a DNN based on a performance analysis of a set of machine learning models, and therefore increase trust and confidence in the results generated by a DNN. Further, by providing the factors used by the best performing machine learning model to explain the generated results of a DNN, the accuracy and performance of the DNN can still be used to generate precise results. Finally, unlike conventional techniques, the techniques for providing factors described herein do not use an extensive amount of computational resources and provide an efficient technique to interpret the results generated by a DNN.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
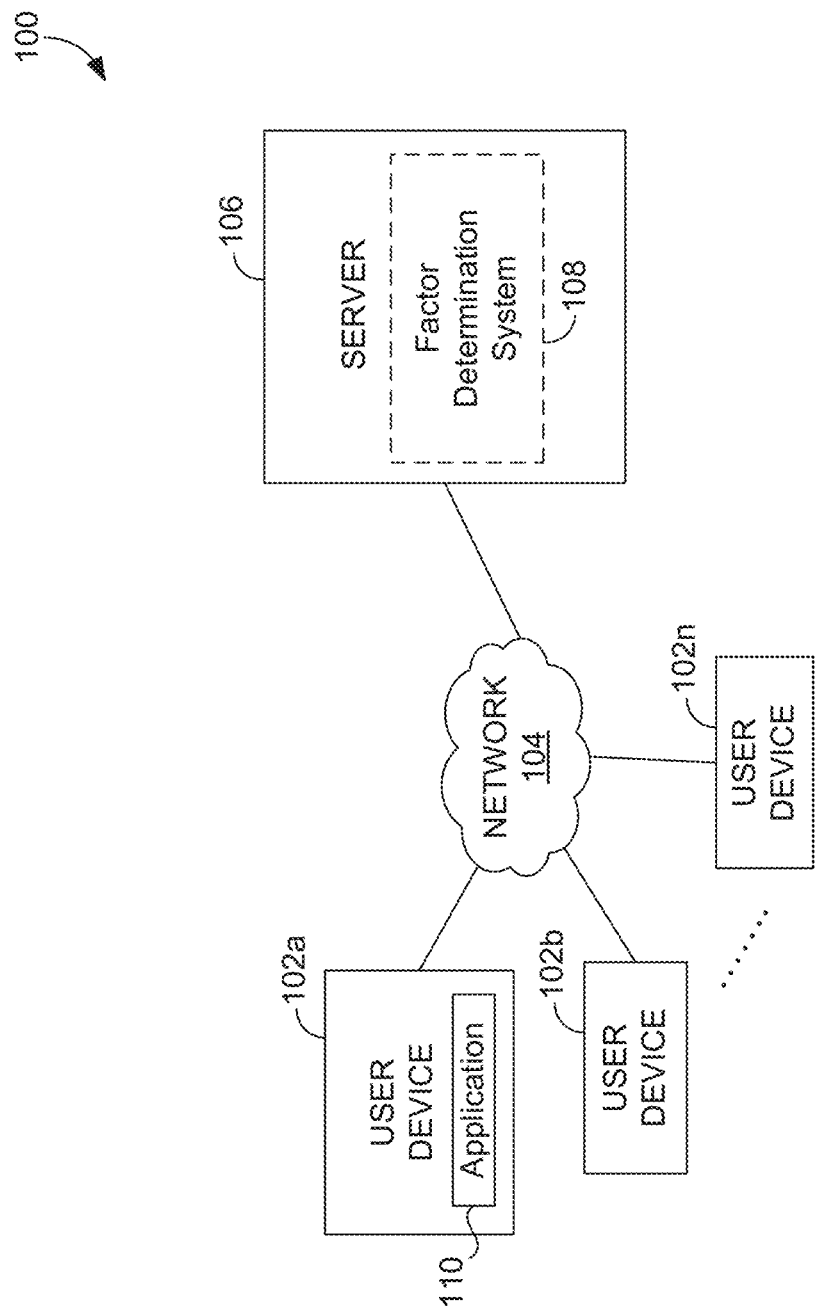
FIG. 1 is a block diagram of an exemplary computing system for providing factors used by a machine learning model to generate results for explaining the corresponding generated results of a DNN, in accordance with embodiments of the present invention.

Understanding the factors used by artificial intelligence algorithms to reach a decision is critical to marketers. Often it is critical for analysts to understand and interpret these factors in order to determine what may or may not drive a particular outcome. As defined herein, factors refer to the underlying factors that influence the results generated by a traditional machine learning model, neural network based AI models (including deep neural networks), or other AI models given a particular input (i.e., dataset). Interpreting these factors may expose information that a marketer, analyst or other user would not have otherwise considered. Additionally, it may help establish trust with users that AI predictions are considering appropriate and relevant factors.

Determining the factors used to generate outcomes by traditional machine learning models is relatively straightforward and well-known in the art. Typically, the results of some traditional machine learning models may be interpreted by tracing the results step-by-step all the way back to the input. Other traditional machine learning models and algorithms typically require the extraction of input features before classifying an input data set. Because the input features are known, this allows for less complex data and makes patterns affecting the outcomes more visible. Compared to traditional machine learning models, a deep neural network (DNN) offers better accuracy and performance than traditional machine learning models. Neural networks learn features from input data in an incremental manner and can handle large amounts of data compared to other machine learning models. Neural networks often use graphical processing units (GPUs) that assist in handling massive amounts of data and provide more processing power. Additionally, as a DNN adds more features to consider in its outcome, it can properly adjust the weights of all connected nodes in the network through training and backpropagation, allowing its predictions to remain stable as the data becomes more complex. However, fully-trained DNNs with complicated architectures typically do not provide a way to easily interpret the factors that influence the results due to the potentially millions of connections formed with various weights. This complexity makes it difficult for marketers or other users to analyze the rationale behind a DNN's predicted outcome.

Conventionally, when the need for interpreting and understanding machine-generated results is a critical consideration, conventional non-DNN based machine learning algorithms are used, trading off accuracy and performance in order to better interpret the results. For example, a healthcare, financial, or governmental entity may be required by laws and regulations to explain how they reached a particular decision by explaining the factors that resulted in the decision made (e.g. credit score decisions, public education decisions, etc.). For AI systems, common methods include analyzing the distribution of weights after training a neural network based model to provide explanations about the outcome, but this method does not guarantee complete accuracy. Still other methods for AI system outcome explanation include altering input values of a neural network and examining the impact on the output values in order to expose some of the factors influencing the output values. However, this requires an extensive amount of computational resources and does not properly scale as the number of input features considered by the neural network increases given the potentially millions of connections and nodes in a DNN.

Accordingly, embodiments of the present invention are directed to providing factors that explain the generated results of a DNN with a given dataset in order to increase trust and confidence in the DNN results. At a high level, embodiments described herein evaluate the performance of machine learning models to generate machine learning model results and a DNN to generate a neural network result in order to select the "best performing" machine learning model, i.e., the machine learning model having the closest performance relative to the neural network on the same testing dataset. The factors used by the machine learning model with the closest performance to the DNN may be determined and provided with the results generated by the neural network. As such, providing those factors to explain the generated results relating to the given dataset may increase confidence that the results were generated accurately.

Generally, the performance of multiple trained machine learning models may be compared relative to a trained DNN on the same testing dataset. The machine learning model that produces results closest to the results produced by the DNN is selected to provide the factors used by the machine learning model to generate the results that explain the corresponding generated results of the DNN. Evaluating the machine learning models may be done incrementally through a comparison of standard accuracy metrics and a distribution analysis to narrow the number of machine learning models whose performance may be compared relative to the DNN. Advantageously, the accuracy and performance of the DNN can be used to generate more accurate predicted outcomes while the factors influencing the DNN's results may be provided by the best performing machine learning model.

More specifically, multiple machine learning models as well as a DNN are trained on the same training dataset. Once trained, the performance of the machine learning models and the DNN are evaluated on the same testing dataset to generate corresponding results. Initially, performance of the trained machine learning models is evaluated based on a comparison of standard accuracy metrics (e.g., ROC curves, Prevision values, Recall values, F1 scores, etc.) and a preliminary set of machine learning models is identified. The preliminary set of machine learning models may have metrics comparable to those of the DNN. Each machine learning model from the preliminary set of machine learning models may be compared to the DNN using a distribution analysis to select a reduced set of machine learning models from the preliminary set. Each input in the testing dataset may be compared using a point-by-point analysis to determine which machine learning model in the reduced set of machine learning models least deviates from the DNN using a predetermined threshold. The machine learning model that produces results closest to the results produced by the DNN is then selected as the best performing machine learning model. Results (e.g., likelihood values) generated by the DNN, and the corresponding factors from the selected machine learning model to generate the corresponding results may be provided to explain and increase confidence in the DNN results.

The machine learning model that least deviates from the DNN can be selected by identifying the machine learning model that generates results correlating to the results generated by the DNN. In some embodiments, the results indicate the likelihood (e.g., probability) of a particular customer to perform an activity. The likelihood values for each customer in the testing dataset may be generated by the DNN and preliminary set of machine learning models. The preliminary set of machine learning models are selected as being likely to produce the closest likelihood values with respect to the DNN based on information known about the training and testing datasets. In some embodiments, the machine learning models and DNN may be binary classifiers that produce likelihood values. For example, the likelihood values may be a result of the outcome of the sigmoid function in the context of the DNN. As such, the machine learning models and DNN may be any suitable classifier for providing factors that explain the generated results of a DNN.

A distribution analysis may be used to obtain the distribution of the likelihood values per customer generated by the DNN and the preliminary set of machine learning models using the testing dataset as input. The distribution analysis may be visualized by plotting the likelihood values produced for each customer in the dataset for the DNN and each of the machine learning models from the preliminary set using any suitable distribution analysis method such as a Kolmogorov Smirnov (K-S) test. A reduced set of machine learning models whose distribution most closely matches the distribution of the DNN may be selected (e.g., the top k (1-3) machine learning models) as the top performing machine learning models among the preliminary set. The corresponding likelihood values for the DNN and the reduced set of machine learning models may be compared to determine if the likelihood values for each customer in the testing dataset fall within a similarity threshold.

More specifically, a positive outcome rate may be determined to select the machine learning model from the reduced set that most closely matches the performance of the DNN. When comparing the corresponding likelihood value for each customer for the DNN and each machine learning model in the reduced set of machine learning models, a predetermined similarity threshold may be calculated. For example, in some embodiments, the threshold may be a percentage that determines how closely the likelihood values generated by each machine learning model in the reduced set of machine learning models must match the likelihood values generated by the DNN for a particular customer in the testing dataset. If the likelihood value produced by a machine learning model in the reduced set of machine learning models is within the threshold of the likelihood value produced by the DNN for the same customer, a positive outcome counter for the machine learning model will increase. Subsequently, a positive outcome rate may be determined by taking the number of positive outcomes for each machine learning model in the reduced set of machine learning models and dividing by the total number of customers in the testing dataset. The machine learning model with the highest positive outcome rate may be selected as the best performing model to provide factors for explaining the results produced by the DNN.

Accordingly, the present technique can be used to provide factors used by a best performing machine learning model to generate results for explaining the corresponding generated results of a DNN. When operating on large datasets, the accuracy and performance of a DNN can be retained while also providing the most important factors influencing the DNN's predicted outcomes in order to increase trust and confidence in the DNN results. As such, the present technique significantly reduces the amount of computational resources required to explain and interpret the results produced by a DNN.

Having briefly described an overview of aspects of the present invention, various terms used throughout this description are provided. Although more details regarding various terms are provided throughout this description, general descriptions of some terms are included below to provide a clear understanding of the ideas disclosed herein.

A machine learning model generally refers to any machine learning model, tool, or framework using any suitable machine learning method (e.g., K-nearest neighbor, logistic regression, binary classifier, etc.) that does not use a neural network framework.

A neural network generally refers to a framework of machine learning based on a collection of connected units or nodes called artificial neurons. It is a machine learning framework that uses a cascade of multiple layers of nonlinear processing units for feature extraction and transformation. Each successive layer uses the output from the previous layer as input, learns in supervised (e.g., classification) and/or unsupervised (e.g., pattern analysis) manners, and learns multiple levels of representations that correspond to different levels of abstraction (the levels form a hierarchy of concepts).

A deep neural network generally refers to a neural network with one or more hidden layers. In other words, a DNN may refers to any neural network with an additional layer to its input layer and output layer.

A factor, or factors, generally refers to criteria that affect the results and/or outcomes generated by a machine learning model, neural network based model, or deep neural network based model.

A likelihood value generally refers to the output of a machine learning model or DNN that is a number between 0 and 1 representing the likelihood of a customer to perform a particular activity.

Example Factor Determination Environment

FIG. 1 depicts a block diagram of exemplary environment 100 suitable for use in implementing embodiments of the invention. Generally, environment 100 is suitable for providing factors used by a machine learning model to generate results, and among other things, facilitates providing factors used a machine learning model to generate results for explaining the corresponding generated results of a DNN. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that operating environment 100 shown in FIG. 1 is an example of one suitable operating environment. Among other components not shown, operating environment 100 includes a number of user devices, such as user devices 102a and 102b through 102n, network 104, and server(s) 106. Each of the components shown in FIG. 1 may be implemented via any type of computing device, such as one or more of computing device 900 described in connection to FIG. 9, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 9. By way of example and not limitation, a user device may be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 106 for providing factors used by a machine learning model to generate results for explaining the corresponding generated results of a DNN according to the present disclosure. In some implementations, the application(s) comprises a web application, which can run in a web browser, and could be hosted at least partially on the server-side of environment 100. In addition, or instead, the application(s) can comprise a dedicated application, such as an application having analytics functionality. In some cases, the application is integrated into the operating system (e.g., as a service and/or program). It is therefore contemplated herein that "application" be interpreted broadly. In some embodiments, the application may be integrated with factor determination system 108.

In accordance with embodiments herein, the application 110 can facilitate providing factors used by a machine learning model to generate results for explaining the corresponding generated results of a DNN in order to explain such factors and increase confidence in the results. In particular, a set of machine learning models and a DNN are trained on the same training dataset and evaluated on the same testing dataset to determine the machine learning model that produces the most similar results (e.g., likelihood values) with respect to the DNN. The factors used to generate results by the machine learning model with the closest performance to the DNN may be provided with the results (e.g., likelihood values) generated by the DNN. For example, application 110 can be used to provide factors used by a best performing machine learning model to generate results for explaining the corresponding generated results of a DNN to a user of the user device 102*a*.

As described herein, server 106 can facilitate providing factors used by a machine learning model to generate results for explaining the corresponding generated results of a DNN to a user via factor determination system 108. Server 106 includes one or more processors, and one or more computer-readable media. The computer-readable media includes computer-readable instructions executable by the one or more processors. The instructions may optionally implement one or more components of factor determination system 108, described in additional detail below. It should be appreciated that while factor determination system 108 is depicted as a single system, in embodiments, it can function as multiple systems capable of performing all the attributes of the system as described.

Factor determination system 108 generally provides factors used by a machine learning model to generate results for explaining the corresponding generated results of a DNN based on a machine learning model performing closest to the DNN. Factor determination system 108 can be implemented using a set of trained machine learning models and a trained DNN to determine the performance of each machine learning model in the set of machine learning models compared with the performance of the DNN on a testing dataset. In this way, the machine learning model with an evaluated performance closest to the DNN may be selected and the factors used by the selected machine learning model to generate results may be determined and provided with the corresponding generated results of the DNN in order to explain and thereby increase confidence in the accuracy of the results.

For cloud-based implementations, the instructions on server 106 may implement one or more components of factor determination system 108. Application 110 may be utilized by a user to interface with the functionality implemented on server(s) 106, such as factor determination system 108. In some cases, application 110 comprises a web browser.

Thus, it should be appreciated that factor determination system 108 may be provided via multiple devices arranged in a distributed environment that collectively provide the functionality described herein. Additionally, other components not shown may also be included within the distributed environment. In addition, or instead, factor determination system 108 can be integrated, at least partially, into a user device, such as user device 102*a*. Furthermore, factor determination system 108 may at least partially be embodied as a cloud computing service.

Figure 2:
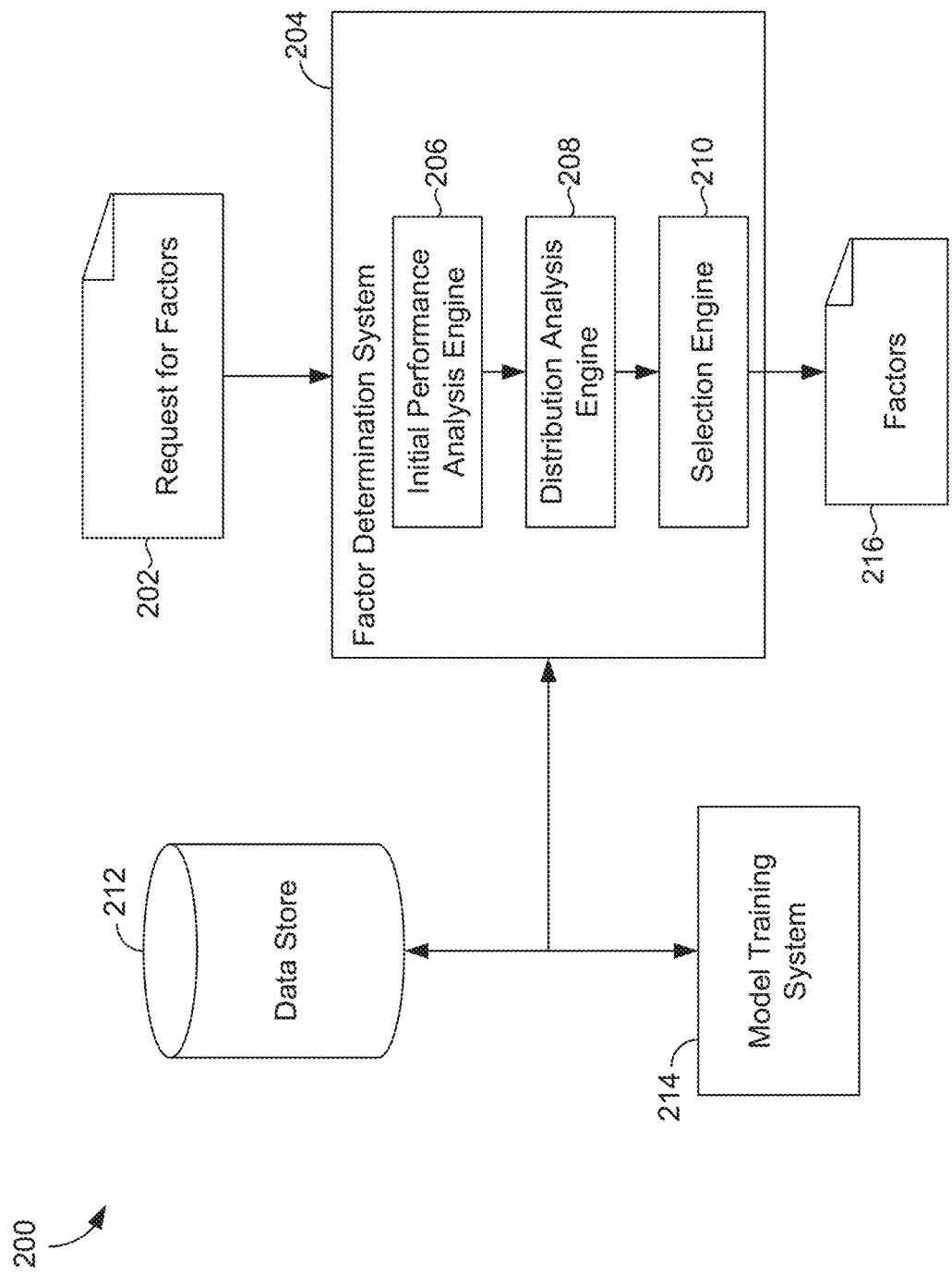
FIG. 2 is a block diagram of an exemplary computing system for providing factors used by a machine learning model to generate results for explaining the corresponding generated results of a DNN, in accordance with embodiments of the present invention.

Referring to FIG. 2, FIG. 2 provides an illustrative factor determination environment for providing factors used by a machine learning model to generate results for explaining the corresponding generated results of a DNN, in accordance with embodiments of the present disclosure. Data store 212 can store computer instructions (e.g., software program instructions, routines, or services), data, and/or models used in embodiments described herein. In some implementations, data store 212 stores information or analytics data from customers with associated subscriptions and other customer related information. Although depicted as a single component, data store 212 may be embodied as one or more data stores. Further, the information in data store 212 may be distributed in any suitable manner across one or more data stores for storage (which may be hosted externally).

In embodiments, data stored in data store 212 includes collected analytics data. Analytics data generally refers to data collected from customers of a particular product or service, or portions thereof. As such, analytics data can include customer data, customer subscription data, information regarding customer interactions within a marketing platform, etc. One example of the data store is ADOBE® Data Warehouse, which can store collected customer data. Customer data may include data related to users and/or customers of a marketing platform such as the Marketo Engagement Platform, customer subscription data, and any other data collected from users in any suitable manner. Customer subscription data may include information related to what subscription(s) a user has, how long the user has been subscribed, when the user interacts with the subscription, etc. In some cases, data can be received directly from user devices or from one or more data stores in the cloud.

In some embodiments, data store 212 may provide any data stored in data store 212 to model training system 214. Multiple machine learning models and a DNN may be trained using model training system 214. Model training system 214 may train the multiple machine learning models and the DNN using any combination of information or analytics data from data store 212 including, but not limited to, customer subscription data and other customer related information. In some embodiments, the multiple machine learning models and the DNN may be trained on the same training dataset. Model training system 214 may use any suitable method for training the machine learning models and the DNN. In some embodiments, model training system 214 may periodically train models, including machine learning models and neural network based models, according to predetermined schedules. In other embodiments, models may be trained automatically upon the occurrence of some condition or event. The training dataset may contain any information stored in data store 212 including, but not limited to, information or analytics data from customers with associated subscriptions and other customer related information. Trained machine learning models and trained DNNs may be accessed by factor determination system 204 in order to facilitate providing the factors influencing the generated results of a DNN.

Factor determination system 204 can provide factors used by a machine learning model to generate results for explaining the corresponding generated results of a DNN utilizing analytics data, or any other data, associated with customers gathered by a business intelligence, analytics program(s) (e.g., Marketo Engagement Platform), or any other product or service. This analytics data can be utilized by the system to allow users to gain insight about how underlying factors affect a user's likelihood to perform an activity (e.g., open an email, attend an event, etc.). As such, the factor determination system 204 is capable of providing factors used by a machine learning model to generate results for explaining the corresponding generated results of a DNN. In some embodiments, factor determination system 204 may use trained machine learning models and a trained DNN from model training system 214 to provide factors used by a machine learning model to generate results for explaining the corresponding generated results of a DNN. To generate the factors, the factor determination system 204 can evaluate the performance of a preliminary set of trained machine learning models and a trained DNN on a testing dataset. A reduced set of machine learning models with likelihood value distributions closest to the DNN may be selected based on a distribution analysis. Subsequently, the results (e.g., likelihood values) produced by each of the machine learning models in the reduced set may be compared to the results (e.g., likelihood values) produced by the DNN to determine the best performing machine learning model relative to the DNN for providing factors used by the best performing machine learning model to generate results to explain the corresponding generated results of the DNN.

In this way, to initiate providing factors used by a best performing machine learning model to generate results for explaining the corresponding generated results of a DNN, factor determination system 204 can receive a request for factors 202. In some cases, the request may be automatically triggered. For instance, request for factors 202 can be sent automatically when, for example, a user requests a report of potential customers' likelihoods to perform a particular activity (e.g., open an email, attend an event, etc.). As another example, a request can be launched when a user selects to open a goal tracking report or other marketing report in a web environment. In other cases, a request may be triggered in response to a user selection. For example, a factor request may be initiated when a user clicks a "provide factors" or "review" or "analyze" button. A user may specify when they wish a request to be sent, for instance, by specifying a threshold number of potential customers that may be likely to perform a particular activity. For example, a request may be sent if there are 20 or more potential customers that are found to be likely to attend an event.

A request for factors 202 can include information pertaining to the number of factors to provide, the dataset associated with the factor request, and/or the machine learning models to train. Information about the number of factors can include the number of factors to provide a user (e.g. providing a list of the top 3 factors). Information about the dataset associated with the factors request can include information about which customer, customer subscription data, or other customer related information to access from data store 212. For example, information about the dataset may indicate a particular set of data from data store 212 that may be split into a training and testing dataset based on criteria in the request. Information about the machine learning models can include which machine learning models that a model training system 214 may train. The machine learning models selected for training may further be based on the dataset associated with the request. For example, based on the dataset indicated in the request, request 202 may relay to model training system 214 to train machine learning models such as Random Forest, SVM, XGBoost, Cat Boost, and Decision Tree, among others. Such information can be used to provide factors for generated results of a DNN, discussed further below, with reference to initial performance analysis engine 206, distribution analysis engine 208, and selection engine 210.

Factor determination system 204 can include initial performance analysis engine 306, distribution analysis engine 208, and selection engine 210. The foregoing components of factor determination system 204 can be implemented, for example, in operating environment 100 of FIG. 1. In particular, these components may be integrated into any suitable combination of user devices 102a and 102b through 102n, and server(s) 106.

Initial performance analysis engine 206 of factor determination system 204 is generally configured to receive a request for factors 202 and associated information. Such factors can be used to increase a user's confidence in the results produced by the particular system or service that utilizes a DNN to generate such results. Beneficially, the factors may assist in explaining how the machine learning model or DNN generated its corresponding results and the factor(s) that affected the results. As previously described, request for factors 202 can include information pertaining to the number of factors to provide, the dataset associated with the factor request, and/or the machine learning models to train. As such, initial performance analysis engine 206 can receive the information from the request for factors. In this way, initial performance analysis engine 206 can use standard procedures and metrics to initially evaluate a set of trained machine learning models. The initial set of machine learning models can include any machine learning model except a DNN.

In embodiments, after a request for factors is received by factor determination system 204, initial performance analysis engine 206 can select a preliminary set of machine learning models from the set of trained machine learning models. In some embodiments, the set of machine learning models can include any machine learning model or tool using any suitable machine learning method (e.g., K-nearest neighbor, logistic regression, binary classifier, etc.) that does not use a neural network framework. In other embodiments, the set of machine learning models may include any machine learning model or tool suitable for classifying customers in a testing dataset. In yet other embodiments, the machine learning models may include any machine learning model or tool that uses a binary classifier.

Initial performance analysis engine 206 can compare the performance of the set of traditional machine learning models using standard procedures and metrics (e.g., ROC curves, Precision values, Recall values F1 scores, etc.) on a testing dataset. Such a testing dataset can include information relating to a customer or a customer's subscription(s). Initial performance analysis engine 206 may select a preliminary set of machine learning models having the closest performance to the DNN based on a comparison of the standard procedures and metrics. For example, the DNN may generate metrics such as a Precision value of 0.98, a Recall value of 0.76 and a F1 score of 0.85. Each traditional machine learning model will be evaluated and the set of machine learning models that generate values closest to DNN may be selected as a preliminary set. For example, machine learning models such as Random Forest (SVM (Support Vector Machines), XGBoost, CatBoost, and Decision Tree may produce Precision values, Recall values, and F1 scores within a defined threshold relative to the DNN's corresponding values indicating that these models may be likely to perform closest to the DNN. In this regard, initial performance analysis engine 206 selects a preliminary set of machine learning models from the set of traditional machine learning models to narrow the list of models that are likely to perform closest to the DNN.

Distribution analysis engine 208 is generally configured to compare a distribution analysis on the preliminary set of machine learning models provided by initial performance analysis engine 206. Distribution analysis engine 208 can generate results (e.g., likelihood values) for each customer in the testing dataset for each machine learning model in the preliminary set of machine learning models and the DNN. The associated results (e.g., likelihood values) may be stored in any suitable manner for each machine learning model and the DNN. Additionally, distribution analysis engine 208 can generate distribution graphs to compare the likelihood value distributions produced by each machine learning model in the set of machine learning models and the DNN on the testing dataset. The distribution analysis may be visualized by plotting the likelihood values produced for each customer in the dataset for the DNN and each of the machine learning models from the preliminary set using any suitable distribution analysis method such as a Kolmogorov Smirnov (K-S) test. As such, the distribution analysis engine 208 may determine a reduced set of machine learning models (e.g., top k (1-3) machine learning models) whose likelihood distributions match closely with the likelihood distribution of the DNN.

Selection engine 210 is generally configured to compare the similarity of each machine learning model in the reduced set of machine learning models with the DNN. The similarity may be determined by comparing the results generated for every data point in the testing dataset. In some embodiments, selection engine 210 may access the stored likelihood values associated with each machine learning model in the reduced set. As such, upon receiving the reduced set of machine learning models from distribution analysis engine 206, and based on the request for factors 202, selection engine 210 can determine the machine learning model from the reduced set of machine learning models that least deviates from the DNN comparing every data point in the testing dataset. As mentioned with respect to initial performance analysis engine 206 and distribution analysis engine 208, selection engine 210 may use the same testing dataset from data store 212 for comparing the reduced set of machine learning models and the DNN. As such, selection engine 210 can select the machine learning model from the reduced set of machine learning models with the closest performance to the DNN for providing factors to explain the generated results of the DNN. In one embodiment, the selection engine 210 can select the best performing machine learning model that least deviates from the DNN. In some embodiments, a predetermined similarity threshold may be used to determine a positive outcome rate generated by each model in the reduced model set. In this way, the machine learning model with the closest (i.e., best) performance relative to the DNN may be determined as the model with the highest positive outcome rate. Subsequently, the machine learning model with the highest positive outcome rate can be selected to provide the factors for interpreting the generated results of the DNN.

Upon performance selection engine 210 selecting the best performing machine learning model, one or more factors used by the best performing machine learning model to generate results can be determined and provided based on user criteria. For example, a user may desire factor determination system 204 to provide the top 3 factors. The factors may be ordered and/or ranked according to the corresponding weights of the factors. Additionally, selection engine 210 can present one or more factors 216. Factors 216 can be presented to a user in real-time upon generation of a report, such as a marketing analytics report. In some embodiments, the factors may be presented as a list in the web browser near a generated report. In other embodiments, a separate file may be generated and presented as a hyperlink or downloadable file in order for the user to access the list of factors.

Figure 3:
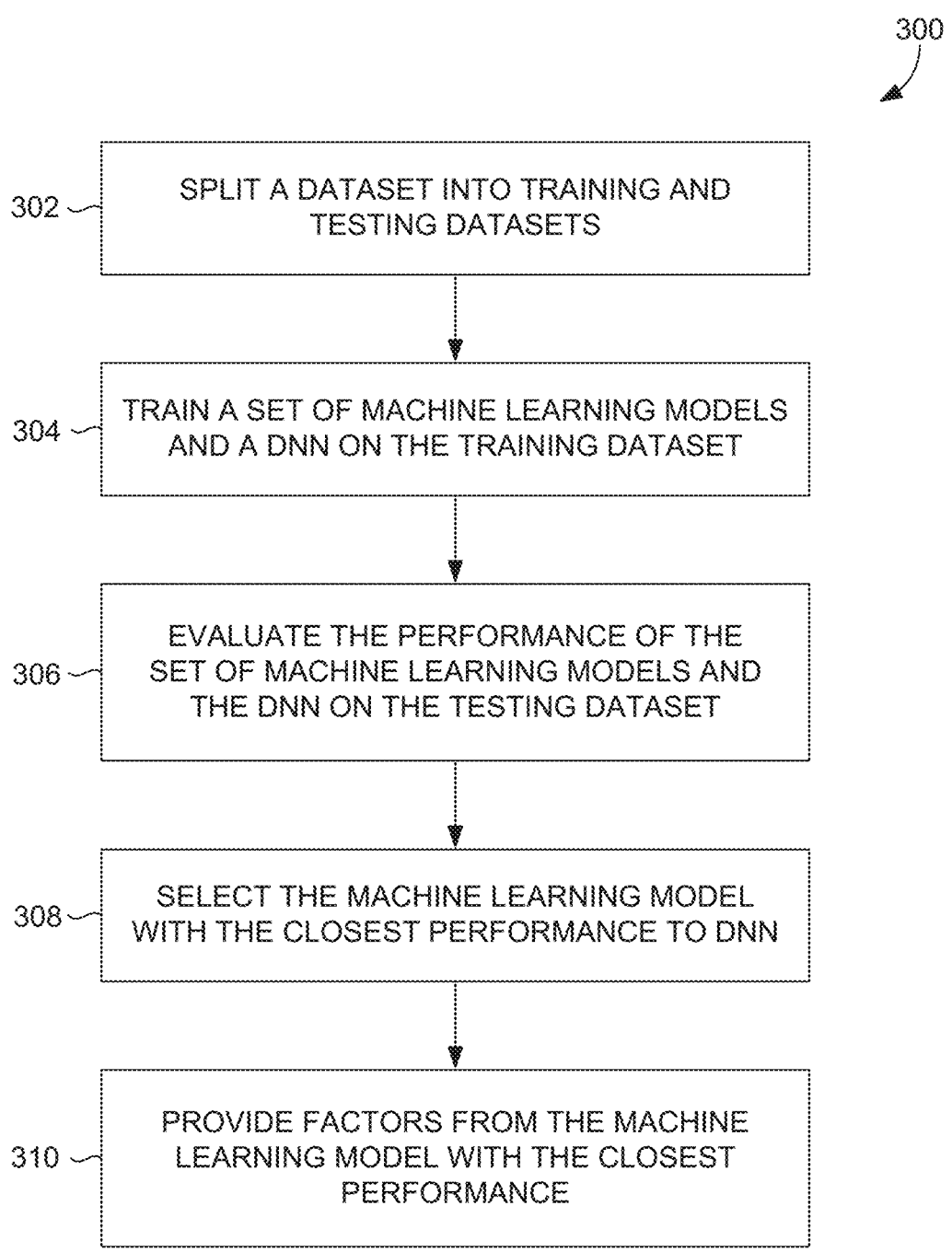
FIG. 3 is a flow diagram showing a method for providing factors used by a machine learning model to generate results for explaining the corresponding generated results of a DNN, in accordance with embodiments of the present invention.

Referring now to FIG. 3, FIG. 3 is a flow diagram showing a method for providing factors that explain the generated results of a DNN, in accordance with embodiments of the present invention. As depicted, process flow 300, beings at block 302 where a dataset may be split into a training dataset and a testing dataset. The data in the split dataset can be any information nor analytics data related to a customer including customer subscription data. In some embodiments, with reference to FIG. 2, data store 212 may determine the location to split the dataset into a training and testing dataset based on criteria received in the request for factors 202.

At block 304, a set of machine learning models and a DNN may be trained on the same training dataset split from the dataset in block 302. In some embodiments, the set of machine learning models may initially be selected from the set of all available machine learning models. For example, some machine learning models may not be appropriate for providing factors for generated likelihood values (e.g., non-neural network based models). As such, these models may be excluded from being trained on the training dataset and other machine learning models are selected for training.

At block 306, the performance of each machine learning model in the set of machine learning models and the DNN may be evaluated on the same testing dataset to generate results for each of the machine learning models and the DNN. Various embodiments of evaluating the performance of each machine learning model and the DNN are discussed in conjunction with at least process 400 of FIG. 4. Initially, standard accuracy and performance tests may be performed on the trained machine learning models to select a preliminary set of the most accurate machine learning models. Once the preliminary set is selected, a distribution analysis is performed on each of the machine learning models in the preliminary set as well as the DNN. In some embodiments, a reduced set of the machine learning models with the closest distributions to the DNN may be selected. For each of the machine learning models in the reduced set, likelihood values may be generated and compared to the likelihood values generated by the DNN based on the testing dataset. Accordingly, the performance of the set of machine learning models can be evaluated with respect to the performance of the DNN.

At block 308, the machine learning model with the closest performance metrics to the DNN may be selected. At block 310, the machine learning model selected at block 308 can be used to provide factors used by the selected machine learning model to generate results for explaining the corresponding generated results of a DNN. In some embodiments, the provided factors may be ranked according to their corresponding weights before being presented. For example, only the top 3 factors with the highest feature weights in the machine learning model may be presented.

Figure 4:
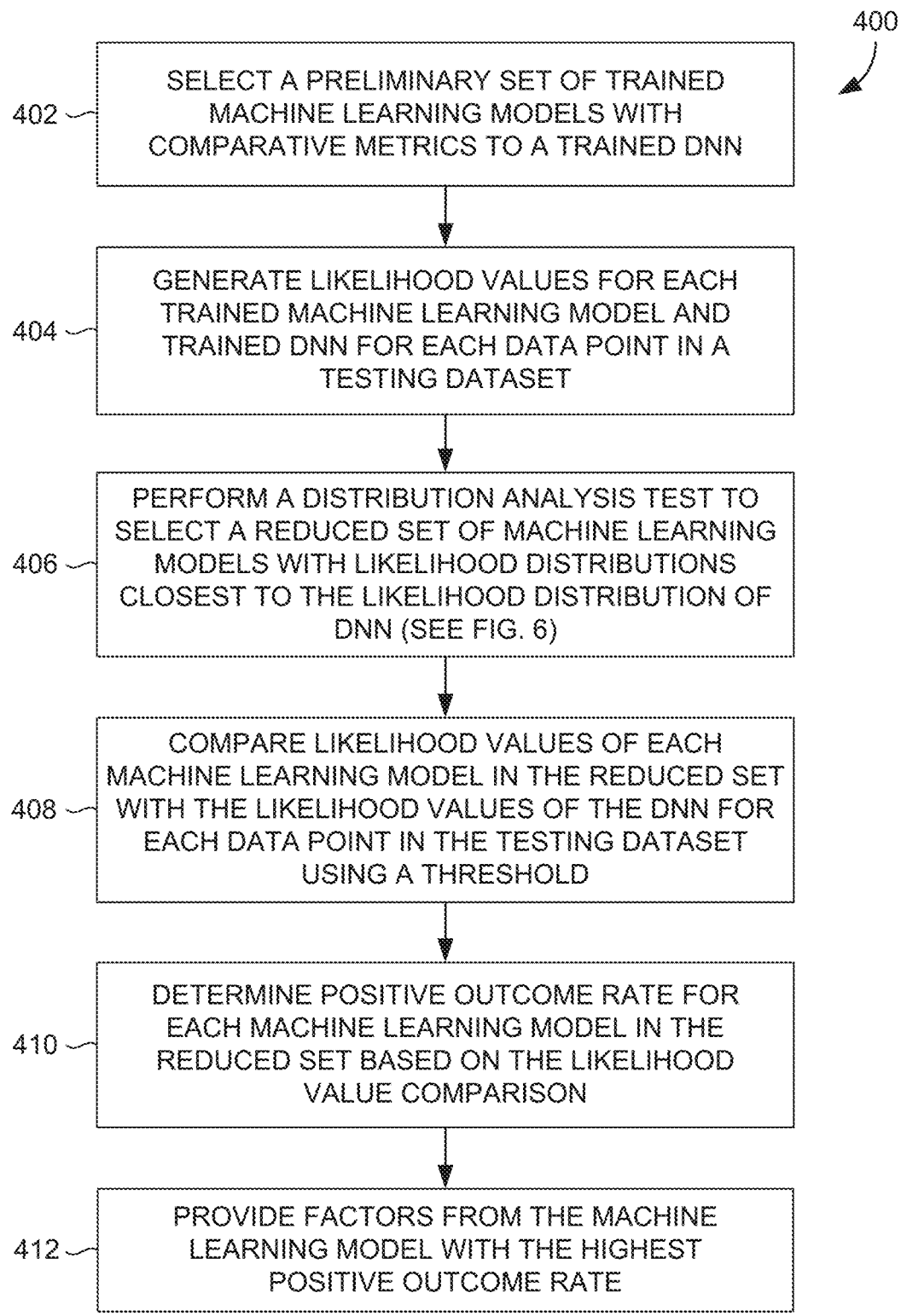
FIG. 4 is a flow diagram showing a method for evaluating the performance of machine learning models, in accordance with embodiments of the present invention.

Turning now to FIG. 4, FIG. 4 is a flow diagram showing a method for evaluating the performance of a set of trained machine learning models and a trained DNN using a testing dataset. Initially, at block 402 a preliminary set of trained machine learning models may be selected based on an evaluation of the trained DNN using standard performance and accuracy methods. For example, each machine learning model in the set of trained machine learning models and the DNN may generate an associated ROC curve, Precision value, Recall value, F1 score, or any other suitable accuracy metric, on the testing dataset. The metrics of each machine learning model may then be compared to the same metrics generated by DNN to determine a preliminary set of trained machine learning models that are within a threshold of performance in relation to the DNN.

At block 404, likelihood values for each trained machine learning model in the preliminary set of trained machine learning models and the trained DNN may be generated for each data point in a testing dataset. For example, for each customer in the testing dataset, the resulting probability of them to perform an activity (e.g., attend a webinar, open an email, register for an event) can be outputted as a likelihood value for each of the trained machine learning models in the preliminary set and the trained DNN. As an example, the likelihood value produced by a trained Random Forest machine learning model for one customer (i.e., a single data point) may be 0.60, indicating a 60% chance that a customer is likely to perform an activity. As such, each trained machine learning model in the preliminary set and the trained DNN may contain an associated set of likelihood values produced for each data point in the testing dataset.

At block 406, a distribution analysis test may be performed to select a reduced set of machine learning models from the preliminary set with likelihood distributions closest to the likelihood distributions of the DNN. Various embodiments of performing a distribution analysis test are discussed in conjunction with at least graph 500 of FIG. 5. Using the set of likelihood values for each of the machine learning models in the preliminary set and the DNN, a distribution analysis test can graph the distributions for each of the machine learning models and the DNN. In some embodiments, the Kolmogorov-Smirnov test can be used to generate the distributions. Once the distributions are determined, the maximum absolute difference between the two cumulative distributions of the machine learning models and the DNN may be determined for each machine learning model. In some embodiments, a reduced set of machine learning models (e.g., top k (1-3) machine learning models) with the shortest absolute differences can be selected as the reduced set of machine learning models.

At block 408, each likelihood value in the set of likelihood values for each machine learning model in the reduced set may be compared with each likelihood value in the set of likelihood values for the DNN to determine if the compared likelihood values are within a predetermined similarity threshold. In some embodiments, the predetermined similarity threshold may be a percentage (e.g., 5%, 10%, etc.) that the likelihood values must fall within. For each likelihood value generated by each machine learning model in the reduced set, if the likelihood value falls within the predetermined similarity threshold of the corresponding likelihood value generated by the DNN, this indicates a positive outcome. In other embodiments, if the likelihood value falls outside of the predetermined threshold, this indicates a negative outcome. For example, a machine learning model in the reduced set may have a corresponding likelihood value of 0.55 for a single data point in its likelihood value set. The corresponding likelihood value for the same data point produced by the DNN may be 0.60. If the predetermined similarity threshold is 10%, then the likelihood value of the machine learning model will fall within the predetermined similarity threshold for the data point because the likelihood value of the reduced model set is between 0.538 and 0.662 (i.e. 10% of 0.60). As such, a positive outcome counter may increase for the associated machine learning model in the reduced set whose likelihood value falls within the predetermined similarity threshold. In some embodiments, a positive outcome may be added to a positive outcome counter associated with each machine learning model in the reduced set when an associated likelihood value in its set of likelihood values falls within the predetermined threshold of the associated likelihood value for the data point in the DNN. In other embodiments, each machine learning model in the reduced set and the DNN may have an associated negative outcome counter that keeps track of the number of negative outcomes.

At block 410, a positive outcome rate can be determined based on the number of positive outcomes for each machine learning model in the reduced set determined at block 408. The positive outcome rate may be determined by dividing the total number of positive outcomes for each machine learning model in the reduced set by the total number of data points in the testing dataset. For example, a CatBoost machine learning model in the reduced set may have 123,000 positive outcomes on a testing dataset that has 230,000 customers in the dataset. Accordingly, the positive outcome rate for the CatBoost machine learning model is 0.5347 (i.e., 123,000÷230,000=0.5347).

At block 412, the factors from the machine learning model with the highest positive outcome rate can be provided for explaining the corresponding generated results of a DNN. In some embodiments, and as mentioned at least in conjunction with FIG. 3, the provided factors may be ranked according to their corresponding feature weights in the machine learning model before being presented. For example, only the top 3 factors with the highest feature weights in the machine learning model may be presented according to their impact (i.e., weight) on the produced results.

Figure 5:
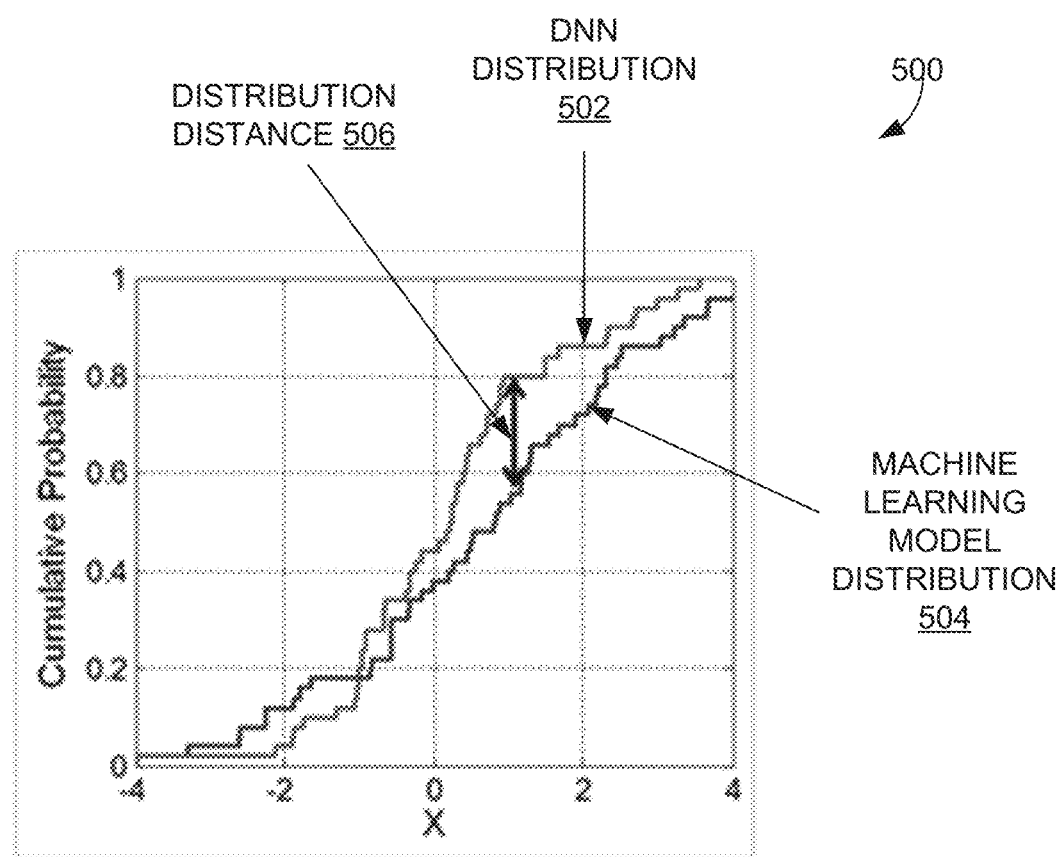
FIG. 5 is a graph illustrating a distribution analysis, in accordance with embodiments of the present invention.

Referring now to FIG. 5, FIG. 5 is graph illustrating a distribution analysis, in accordance with embodiments of the present invention. Distribution analysis graph 500 illustrates an example Kolmogorov-Smirnov (K-S) distribution graph for a machine learning model from the preliminary set and the DNN distribution on every data point in the testing dataset (although it is contemplated that any suitable distribution analysis test can be used). In some embodiments, the horizontal, or x-axis can be changed and/or scaled to appropriately display the distributions. Machine learning model distribution 504 and DNN distribution 502 may be compared using distribution distance 506. As shown, distribution distance 506 measures the maximum absolute difference between machine learning model distribution 504 and DNN distribution 502. The maximum absolute difference (i.e., K-S statistic) can be measured for each machine learning model in the preliminary set with the DNN. The machine learning models with the shortest maximum absolute differences (e.g., top k (1-3) machine learning models) may be selected to be in the reduced set. In some embodiments, the number of machine learning models with the shortest maximum absolute differences may be selected according to a predetermined number. For example, a user may specify that the three machine learning models with the shortest maximum absolute differences may be selected to be in the reduced set. Accordingly, the reduced set of machine learning models may be determined by determining the machine learning models with the shortest maximum absolute difference from the DNN.

Figure 6A:
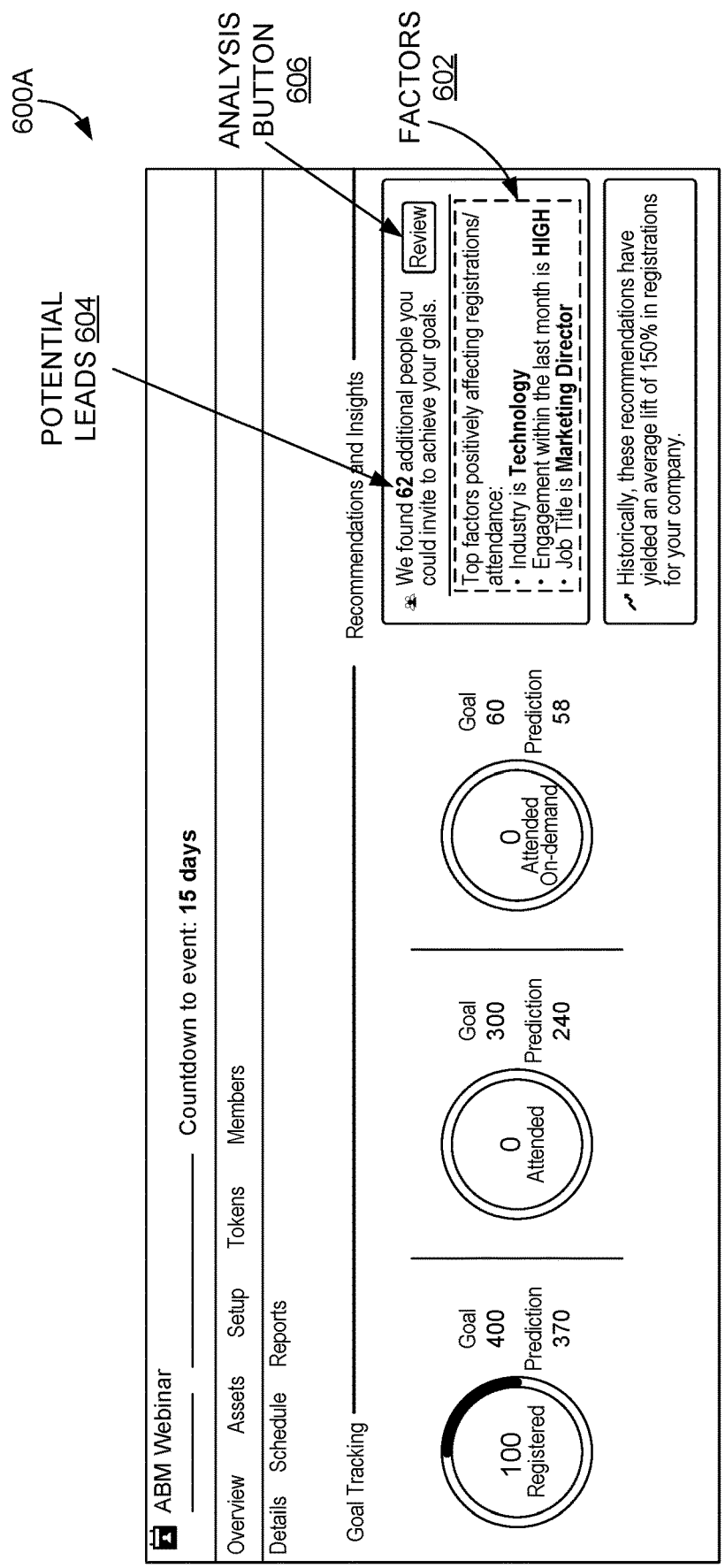
FIG. 6A illustrates an exemplary user interface for providing factors used by a machine learning model to generate results for explaining the corresponding generated results of a DNN, in accordance with embodiments of the present invention.
Figure 6B:
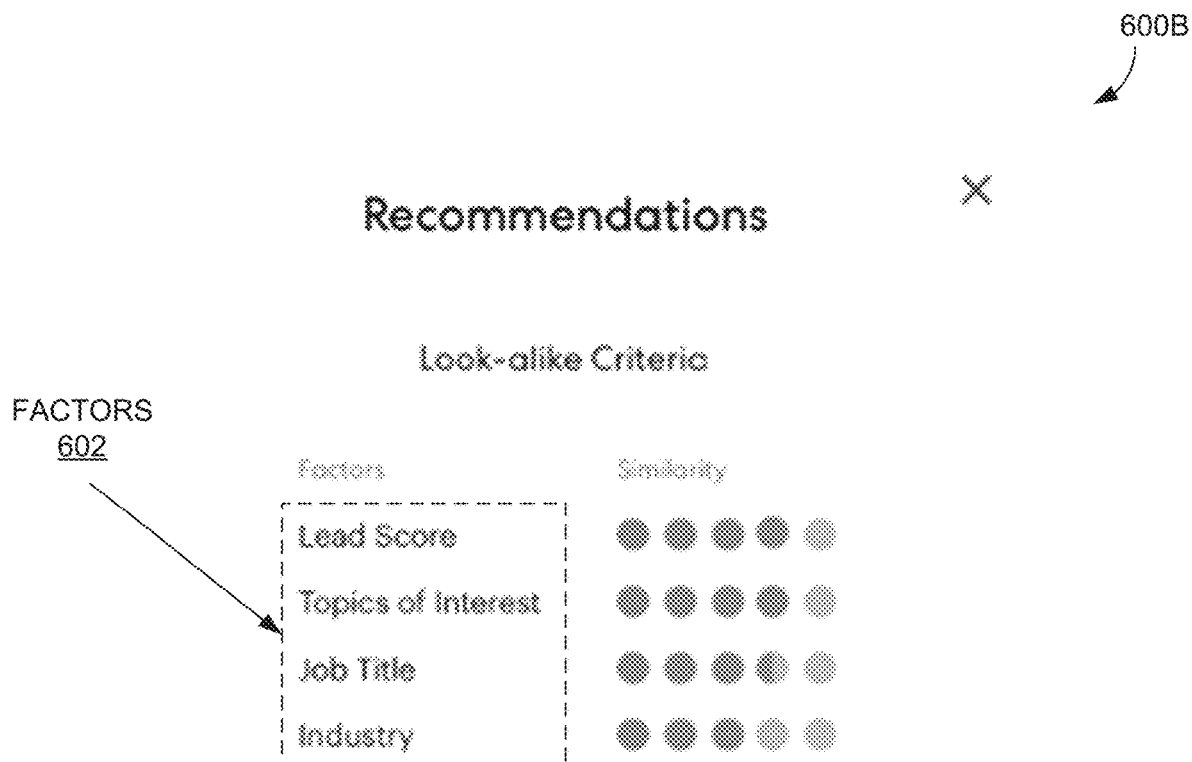
FIG. 6B illustrates an exemplary user interface for providing factors used by a machine learning model to generate results for explaining the corresponding generated results of a DNN, in accordance with embodiments of the present invention.

Referring now to FIG. 6A, FIG. 6A illustrates an exemplary user interface for providing factors used by a machine learning model to generate results for explaining the corresponding generated results of a DNN, in accordance with embodiments of the present invention. For example, the factors from the best performing machine learning model that influence the generation of a number of potential leads 604 by a DNN may be displayed as factors 602. Potential leads 604 refers to the number of potential customers who may be interested in attending a particular event. In some embodiments, the potential leads 604 can be generated based on likelihood values exceeding a threshold. For example, if the DNN produces a likelihood value greater than 0.50 for a particular customer, that customer may be determined to be a potential lead that could be invited to a particular event. Factors 602 indicate the factors used by the best performing machine learning model with the highest positive outcome rate as described in conjunction with at least FIGS. 2-5. In some embodiments, factors 602 may be automatically listed. In other embodiments, factors 602 may be generated by clicking analysis button 606. Analysis button 606 may be any button that sends a request for factors as described conjunction with at least FIGS. 2-5. In yet other embodiments, analysis button 606 may initiate a pop-up screen and/or window that displays additional information relating to factors 602 and the potential leads 604 as described in conjunction with at least FIG. 6B. FIG. 6A, as shown, is one suitable way to present factors from a best performing machine learning model. It is contemplated that any suitable representation for providing factors that explain the generated results of a DNN FIG. 6B illustrates an exemplary user interface for providing factors used by a machine learning model to generate results for explaining the corresponding generated results of a DNN. In some embodiments, user interface 600B may be displayed based on a user clicking and/or selecting analysis button 606 as described at least in FIG. 6A. For example, factors 602 may indicate the elements used by the best performing machine learning model that effect the number of potential leads 604 determined by the DNN. In some embodiments, a predetermined number of factors 602 may be provided. In other embodiments, only the top factors according to feature weights from the best performing machine learning model may be provided. For example, as shown in FIG. 6B, only the top 4 factors from the best performing machine learning model are displayed. The factors are shown in order from highest ranking at the top followed by the next three highest ranked features according to ranking of the feature weights.

Figure 6C:
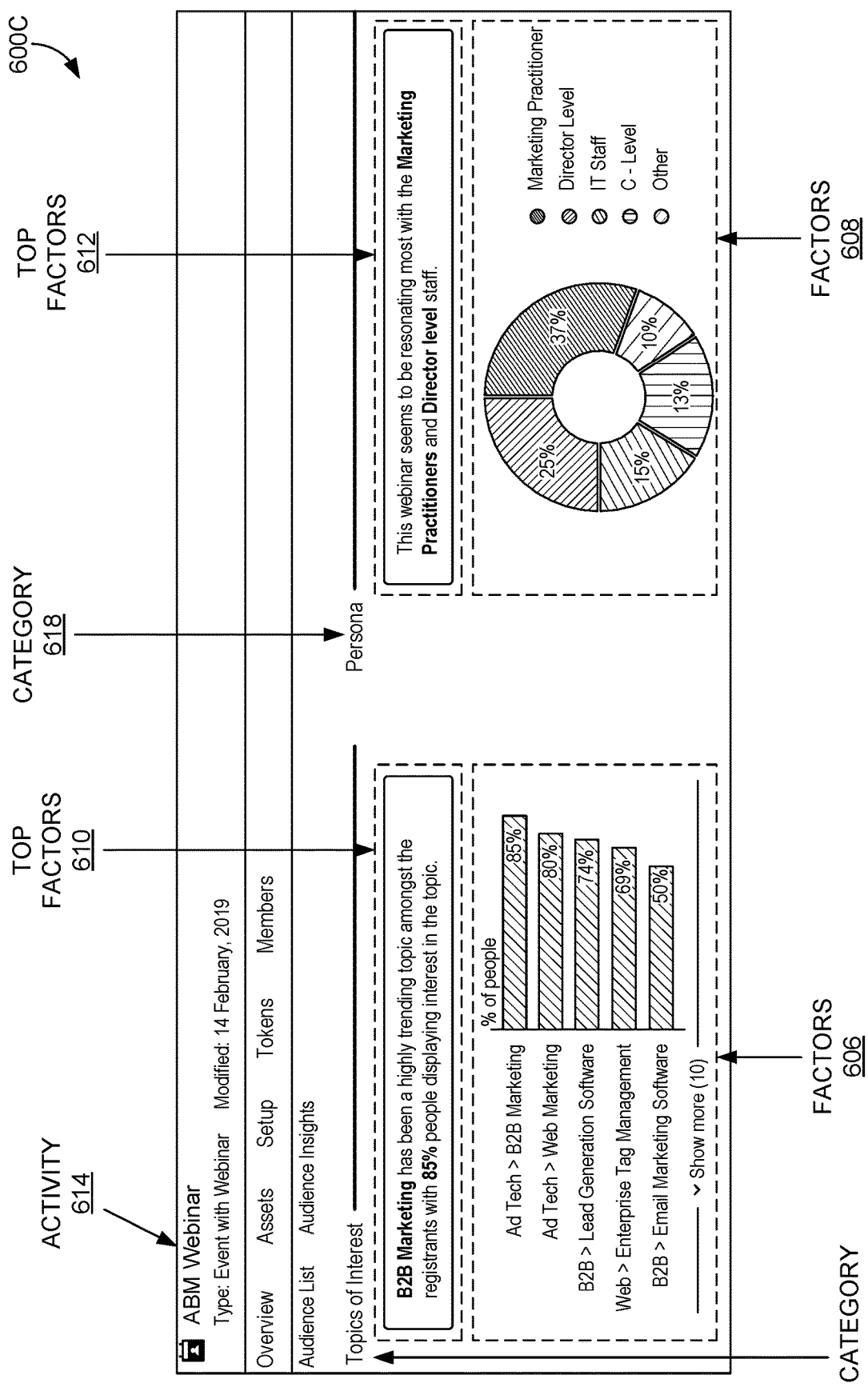
FIG. 6C illustrates an exemplary user interface for providing factors used by a machine learning model to generate results for explaining the corresponding generated results of a DNN, in accordance with embodiments of the present invention.

Turning now to FIG. 6C, FIG. 6C illustrates an exemplary user interface for providing factors used by a machine learning model to generate results for explaining the corresponding generated results of a DNN. In some embodiments, user interface 600C may be displayed as part of a report on factors associated with customers who have already indicated they will or will not perform an activity 614. Activity 614 may be any activity, event, or any other action that a customer may participate in. For example, as shown in FIG. 6C, activity 614 may be a webinar. In some embodiments, there may be multiple categories (i.e., category 616 and 618) containing multiple factors (i.e., factors 606 and 608) from the best performing machine learning model that explain the generated results of a DNN. For example, category 616 may contain factors 606 and other information regarding topics of interest that registered customers for activity 614 are interested in. In another example, category 618 may contain information and factors regarding persona information of customers who have registered for activity 614. Each category 616 and 618 may have one or more associated factors 606 and 608. The associated factors 606 and 608 can be any factors that relate to the category and indicate factors affecting a customer's likelihood to perform an activity. For example, category 616 may contain a list of one or more factors 606 and top factors 610 obtained from the best performing machine learning model that are effecting customer's likelihoods to attend activity 614 based on the generated results of a DNN. In some embodiments, factors 606 and 608 may be ranked according to feature weights. In other embodiments, only a predetermined number of factors 606 and 608 may be shown. In yet other embodiments, factors 606 and 608 may be displayed in any number of ways suitable for providing factors used by a machine learning model to generate results for explaining the corresponding generated results of a DNN. Top factors 610 and 612 may be any factor in relation to its respective category that has the highest feature weight from the best performing machine learning model that most effects a customer's likelihood to attend activity 614. For example, top factors 610 indicate that "B2B Marketing" is the top factor in category 616, "Topics of Interest," that explains the generated results of a DNN related to activity 614. As another example, top factors 612 indicate that "Marketing Practitioners and Director Level staff" are the top factors in category 618, "Persona," that explain the generated results of DNN related to activity 614.

Example Flow Diagrams

Figure 7:
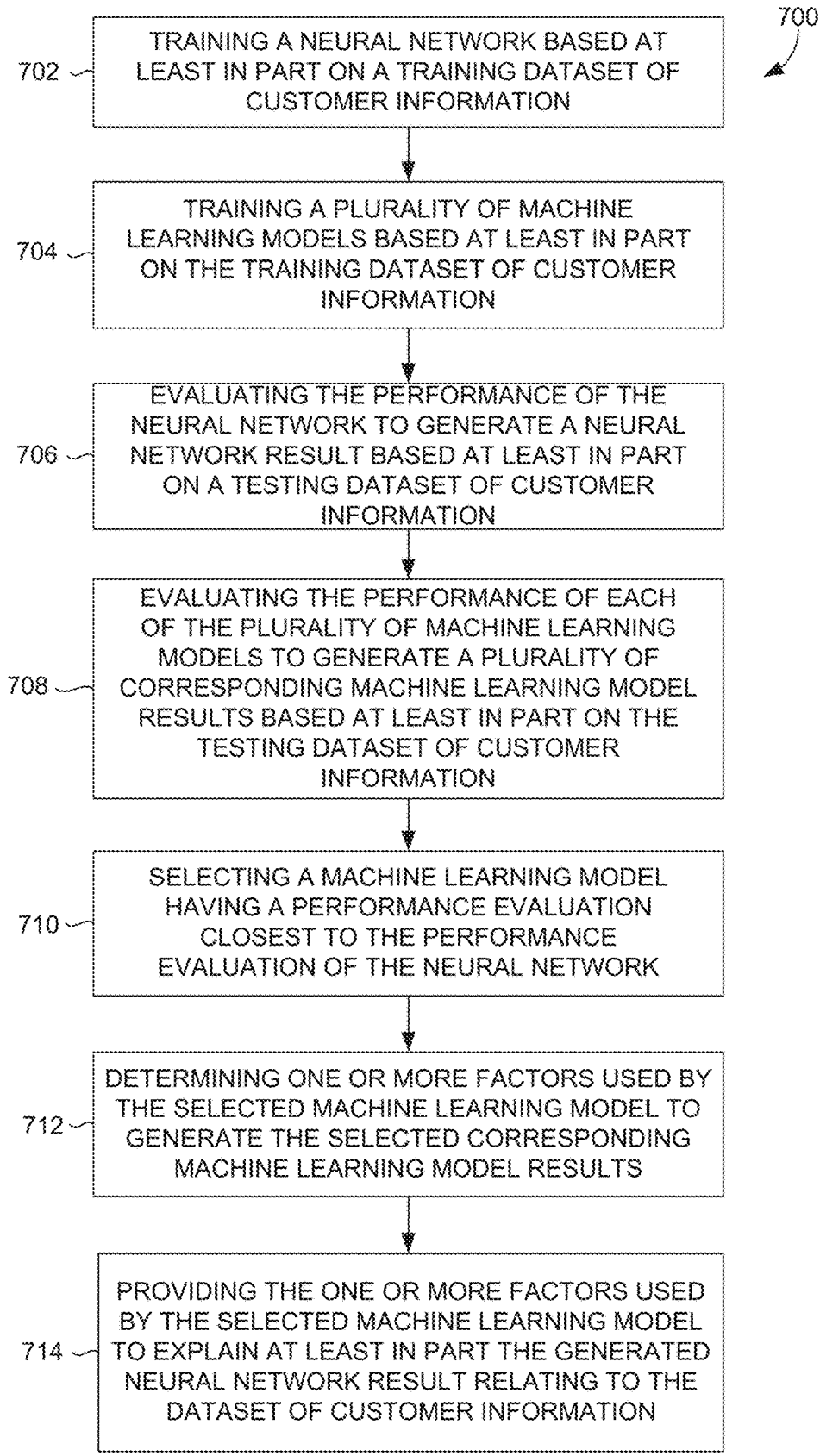
FIG. 7 is a flow diagram showing a method for providing factors used by a machine learning model to generate results for explaining the corresponding generated results of a DNN, in accordance with embodiments of the present invention.
Figure 8:
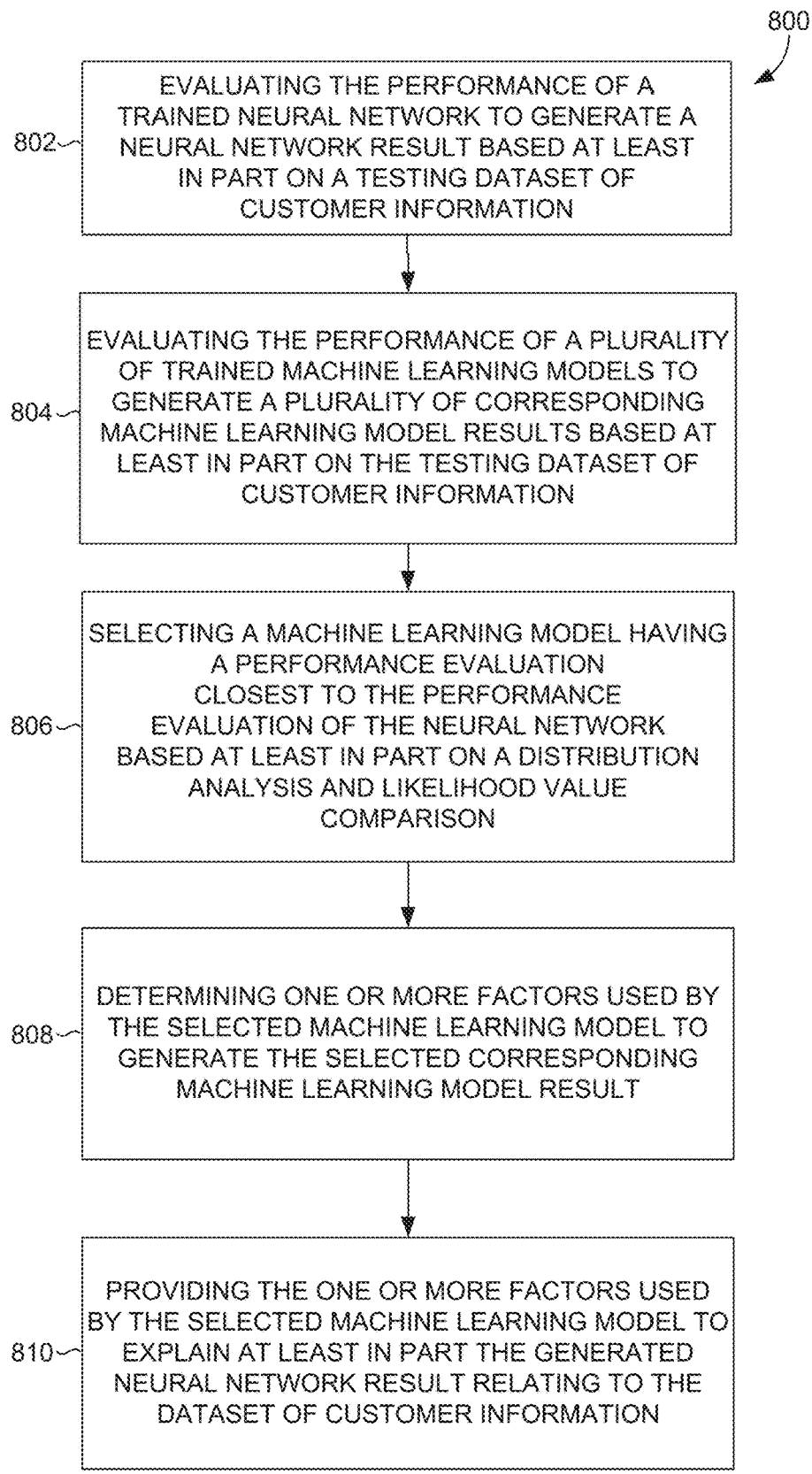
FIG. 8 is a flow diagram showing a method for providing factors used by a machine learning model to generate results for explaining the corresponding generated results of a DNN, in accordance with embodiments of the present invention.

With reference now to FIGS. 7 and 8, flow diagrams are provided illustrating methods for providing factors used by a machine learning model to generate results for explaining the corresponding generated results of a DNN. Each block of methods 700 and 800, and any other methods described herein, comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The methods 700 and/or 800 may be implemented by factor determination system as described in conjunction with at least FIGS. 1-5.

Turning initially to FIG. 7, FIG. 7 illustrates a method 700 for providing factors used by a machine learning model to generate results for explaining the corresponding generated results of a DNN, in accordance with embodiments described herein. Initially at block 702, a neural network is trained based at least in part on a training data set of customer information. At block 704, a plurality of machine learning models are trained based at least in part on the training dataset of customer information. At block 706, the performance of the neural network to generate a neural network result is evaluated based at least in part on a testing dataset of customer information. At block 708, the performance of each of the plurality of machine learning models to generate a plurality of corresponding machine learning model results are evaluated based at least in part on the testing dataset of information. At block 710, a machine learning model having a performance evaluation closest to the performance evaluation of the neural network is selected. At block 712, one or more factors are determined that are used by the selected machine learning model to generate the selected corresponding machine learning model results. At block 714, the one or more factors used by the selected machine learning model are provided to explain at least in part the generated neural network result relating to the data set of customer information.

Turning now to FIG. 8, initially at block 802, the performance of a trained neural network is evaluated to generate a neural network result based at least in part on a testing dataset of customer information. At block 804, the performance of a plurality of machine learning models are evaluated to generate a plurality of corresponding machine learning model results based at least in part on the testing dataset of customer information. At block 806, a machine learning model having a performance evaluation closest to the performance evaluation of the neural network is selected based at least in part on a distribution analysis and likelihood value comparison. At block 808, one or more factors are determined that are used by the selected machine learning model to generate the selected corresponding machine learning model result. At block 810, the one or more factors used by the selected machine learning model are provided to explain at least in part the generated neural network result relating to the dataset of customer information.

Example Operating Environment

Figure 9:
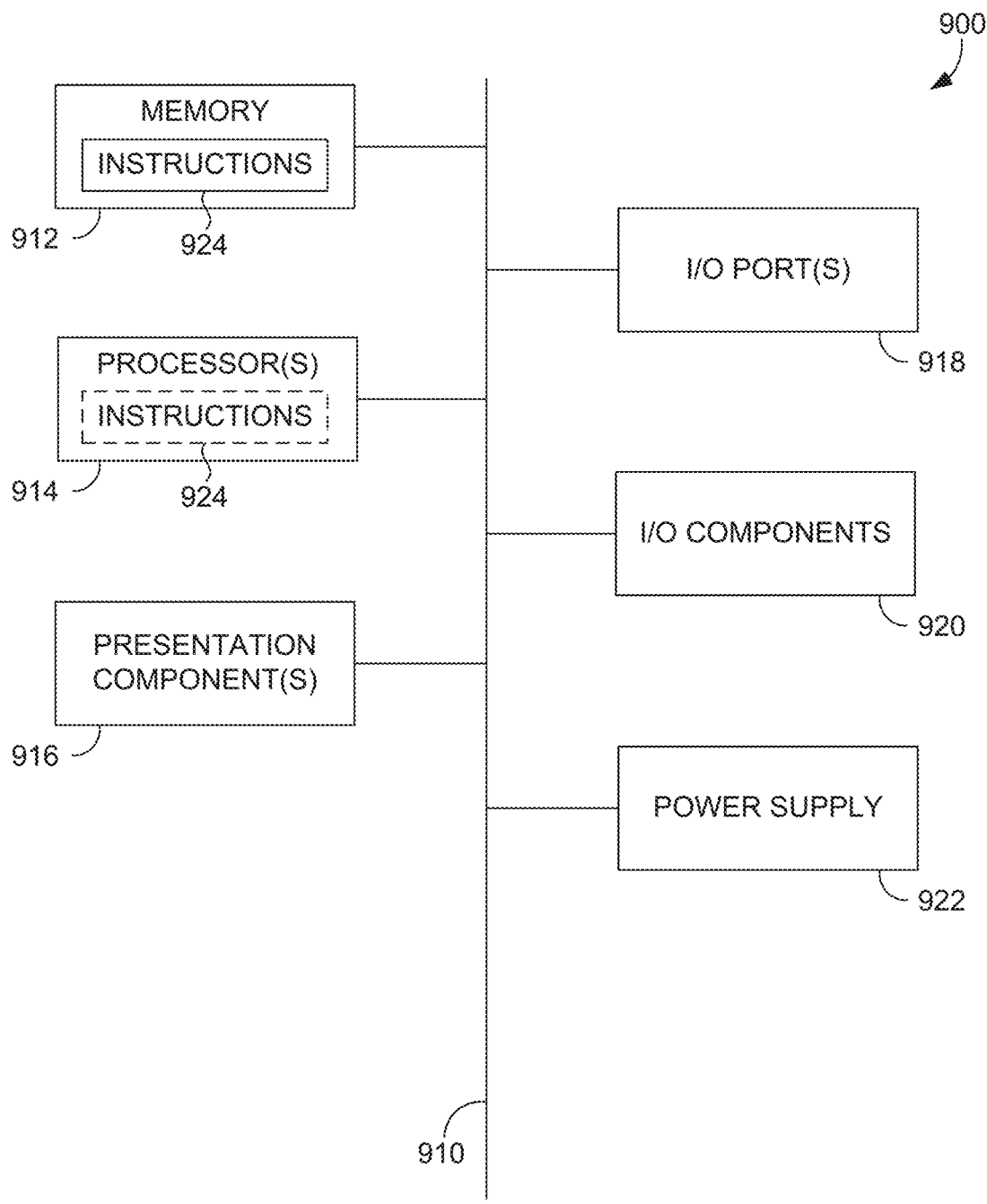
FIG. 9 is a block diagram of an exemplary operating environment in which embodiments of the present invention may be employed.

Having described an overview of embodiments of the present invention, an exemplary operating environment in which embodiments of the present invention may be implemented is described below in order to provide a general context for various aspects of the present invention. Referring now to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 900. Computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of computing device 900 to render immersive augmented reality or virtual reality.

Embodiments described herein support providing factors for explaining the generated results of a DNN. The components described herein refer to integrated components of factor determination system. The integrated components refer to the hardware architecture and software framework that support functionality using the factor determination system. The hardware architecture refers to physical components and interrelationships thereof and the software framework refers to software providing functionality that can be implemented with hardware embodied on a device.

The end-to-end software-based factor determination system can operate within the factor determination system components to operate computer hardware to provide factor determination system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the factor determination system components can manage resources and provide services for the factor determination system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for providing one or more factors that explain a result generated by a neural network relating to a dataset of customer information, the method comprising:
    evaluating the performance of a trained neural network to generate a neural network result based at least in part on a testing dataset of customer information;
    evaluating the performance of a plurality of trained machine learning models to generate a plurality of corresponding machine learning model results based at least in part on the testing dataset of customer information;
    selecting a machine learning model having a performance evaluation closest to the performance evaluation of the neural network based at least in part on a distribution analysis and likelihood value comparison;
    determining one or more factors used by the selected machine learning model to generate the selected corresponding machine learning model result; and
    providing the one or more factors used by the selected machine learning model to explain at least in part the generated neural network result relating to the dataset of customer information.

2. The method of claim 1, wherein evaluating the performance of each of the plurality of machine learning models further comprises determining a preliminary set of trained machine learning models that are within a threshold of performance in relation to the neural network based on metrics.

3. The method of claim 1, wherein evaluating the performance of each of the plurality of machine learning models further comprises evaluating a likelihood distribution for each machine learning model in a preliminary set of machine learning models against a likelihood distribution of the neural network to determine a reduced set of machine learning models.

4. The method of claim 3, wherein determining the reduced set of machine learning models further comprises determining the likelihood distributions of the machine learning models in the preliminary set with a shortest distribution distance between the likelihood distribution of the neural network.

5. The method of claim 1, wherein selecting the machine learning model having a performance evaluation closest to the performance evaluation of the neural network further comprises comparing likelihood values for each machine learning model in a reduced model set with the corresponding likelihood value of the neural network.

6. The method of claim 5, wherein comparing the likelihood values for each machine learning model in the reduced model set with the corresponding likelihood value of the neural network further comprises determining whether the likelihood value for each machine learning model in the reduced set and the corresponding likelihood value of the neural network are within a predetermined similarity threshold.

7. The method of claim 6, wherein determining the likelihood values for each machine learning model in the reduced set that are within the predetermined similarity threshold of the corresponding likelihood value of the neural network indicate a positive outcome.

8. The method of claim 1, wherein selecting the machine learning model having a performance evaluation closest to the performance evaluation of the neural network is further based on determining a highest positive outcome rate for each machine learning model in a reduced set of machine learning models.

9. The method of claim 1, wherein determining the one or more factors further comprises ranking the factors according to their corresponding weights.

10. One or more non-transitory computer storage media having computer-useable instructions that, when used by one or more computing devices, cause the one or more computing devices to perform operations comprising:
    training a neural network based at least in part on a training dataset of customer information;
    training a plurality of machine learning models based at least in part on the training dataset of customer information;
    evaluating the performance of the neural network to generate a neural network result based at least in part on a testing dataset of customer information;
    evaluating the performance of each of the plurality of machine learning models to generate a plurality of corresponding machine learning model results based at least in part on the testing dataset of customer information;
    selecting a machine learning model having a performance evaluation closest to the performance evaluation of the neural network;
    determining one or more factors used by the selected machine learning model to generate the selected corresponding machine learning model result; and
    providing the one or more factors used by the selected machine learning model to explain at least in part the generated neural network result relating to the dataset of customer information.

11. The one or more computer storage media of claim 10, wherein evaluating the performance of each of the plurality of machine learning models further comprises determining a preliminary set of trained machine learning models that are within a threshold of performance in relation to the neural network based on metrics.

12. The one or more computer storage media of claim 10, wherein evaluating the performance of each of the plurality of machine learning models further comprises evaluating a likelihood distribution for each machine learning model in a preliminary set of machine learning models against a likelihood distribution of the neural network to determine a reduced set of machine learning models.

13. The one or more computer storage media of claim 12, wherein determining the reduced set of machine learning models further comprises determining the likelihood distributions of the machine learning models in the preliminary set with a shortest distribution distance between the likelihood distribution of the neural network.

14. The one or more computer storage media of claim 10, wherein selecting the machine learning model having a performance evaluation closest to the performance evaluation of the neural network further comprises comparing likelihood values for each machine learning model in a reduced model set with the corresponding likelihood values of the neural network.

15. The one or more computer storage media of claim 14, wherein comparing the likelihood values for each machine learning model of the reduced model set with the corresponding likelihood values of the neural network further comprises determining whether the likelihood values for each machine learning model in the reduced set and the corresponding likelihood values of the neural network are within a predetermined similarity threshold.

16. The one or more computer storage media of claim 15, wherein determining the likelihood values for each machine learning model in the reduced set that are within the predetermined similarity threshold of the corresponding likelihood values of the neural network indicates a positive outcome.

17. The one or more computer storage media of claim 10, wherein selecting the machine learning model having a performance evaluation closest to the performance evaluation of the neural network is further based on determining a highest positive outcome rate for each machine learning model in a reduced set of machine learning models based at least in part on comparing likelihood values of each machine learning model of the reduced set with likelihood values of the neural network.

18. The one or more computer storage media of claim 17, wherein determining the highest positive outcome rate further comprises determining a total number of positive outcomes associated with each machine learning model in a reduced set of machine learning models and a total number of data points in the testing dataset.

19. The one or more computer storage media of claim 10, wherein determining the one or more factors further comprises ranking the factors according to their corresponding weights.

20. A computer system comprising:
    one or more hardware processors and memory configured to provide computer program instructions to the one or more hardware processors;
    a factor determination system configured to use the one or more hardware processors to provide one or more factors that explain a trained neural network generated result based on a dataset of customer information, the factor determination system comprising:
        a means for evaluating a set of trained machine learning models to generate a corresponding set of machine learning model results based on the dataset of customer information, using the one or more processors, to determine a preliminary set of machine learning models based on a comparison of the machine learning results with a trained neural network generated result;
        a means for evaluating the preliminary set of machine learning models on a corresponding set of machine learning model generated results, using the one or more processors, to determine a reduced set of machine learning models based on a distribution analysis comparison with the trained neural network;
        a means for selecting a machine learning model from the reduced set of machine learning models having a performance evaluation closest to a performance evaluation of the neural network based on a comparison of likelihood values with the neural network;
        a means for determining one or more factors used by the selected machine learning model that explain the corresponding set of machine learning model generated results; and
        a means for providing the one or more factors used by the selected machine learning model, using the one or more processors, to explain at least in part the neural network generated result based on the dataset of customer information.

* * * * *